United States Patent [19]
Cook et al.

[11] Patent Number: 6,013,171
[45] Date of Patent: Jan. 11, 2000

[54] CATALYTIC DEWAXING WITH TRIVALENT RARE EARTH METAL ION EXCHANGED FERRIERITE

[75] Inventors: Bruce R. Cook, Pittstown; Jack W. Johnson, Clinton; Guang Cao, Branchburg, all of N.J.; Rich A. McEvoy, Upper Black Eddy, Pa.; Richard H. Ernst, Glen Gardner, N.J.

[73] Assignee: Exxon Research and Engineering Co., Florham Park, N.J.

[21] Appl. No.: 09/018,019

[22] Filed: Feb. 3, 1998

[51] Int. Cl.$^7$ ........................................... C10G 25/00
[52] U.S. Cl. ........................ 208/27; 208/24; 208/950
[58] Field of Search ................................ 208/27, 24, 950

[56] References Cited

U.S. PATENT DOCUMENTS

| | | | |
|---|---|---|---|
| 3,140,249 | 7/1964 | Plank et al. | 208/120 |
| 3,140,251 | 7/1964 | Plank et al. | 208/120 |
| 3,140,253 | 7/1964 | Plank et al. | 208/120 |
| 4,251,499 | 2/1981 | Nanne et al. | 423/329 |
| 4,335,019 | 6/1982 | Bowes et al. | 252/450 |
| 4,343,692 | 8/1982 | Winquist | 208/111 |
| 4,568,663 | 2/1986 | Mauldin | 502/235 |
| 4,584,286 | 4/1986 | Valyocsik | 502/62 |
| 4,795,623 | 1/1989 | Evans | 423/328 |
| 5,288,475 | 2/1994 | Chang et al. | 423/706 |
| 5,378,348 | 1/1995 | Davis | 208/27 |
| 5,660,714 | 8/1997 | Winttenbrink et al. | 208/79 |
| 5,888,921 | 3/1999 | Tsang et al. | 502/271 |

FOREIGN PATENT DOCUMENTS

| | | | |
|---|---|---|---|
| 9920720 | 4/1999 | WIPO | C10M 143/08 |

*Primary Examiner*—Helane Myers
*Attorney, Agent, or Firm*—Jay Simon

[57] ABSTRACT

A process for dewaxing waxy hydrocarbonaceous materials, such as hydrocarbon fuel and lubricating oil fractions to reduce their cloud and pour points comprises reacting the material with hydrogen in the presence of a dewaxing catalyst comprising at least one metal catalytic component and ferrierite in which at least a portion of its cation exchange positions are occupied by one or more trivalent rare earth metal cations. The rare earth ion exchanged ferrierite catalyst has good selectivity for lubricating oil production, particularly when dewaxing a Fischer-Tropsch wax hydroisomerate. Preferably at least 10% and more preferably at least 15% of the ferreirite cation exchange capacity is occupied by one or more trivalent rare earth metal cations.

11 Claims, No Drawings

CATALYTIC DEWAXING WITH TRIVALENT RARE EARTH METAL ION EXCHANGED FERRIERITE

BACKGROUND OF THE DISCLOSURE

1. Field of the Invention

The invention relates to catalytic dewaxing with a rare earth metal ion exchanged ferrierite. More particularly the invention relates to catalytically dewaxing a waxy hydrocarbonaceous feed to reduce its pour point, using a dewaxing catalyst comprising ferrierite in which one or more trivalent rare earth metals occupy at least a portion of its cation exchange positions.

2. Background of the Invention

Catalytically dewaxing waxy hydrocarbonaceous materials such as paraffinic feeds to reduce their pour point and convert the wax to more useful products, such as fuel and lubricating oil fractions, is known. Such feeds have included petroleum derived wax containing oils, heavy oil fractions and slack wax. Dewaxing catalysts comprise a catalytic metal component, a natural or synthetic, crystalline aluminosilicate or zeolite molecular sieve component and often one or more additional refractory metal oxide components. Molecular sieves which have been found useful for dewaxing petroleum oil fractions and slack wax include, for example, ferrierite (U.S. Pat. Nos. 4,343,692 and 4,795,623), mordenite (U.S. Pat. No. 3,902,988), ZSM-23 and ZSM-35 (U.S. Pat. No. 4,222,855), ZSM-5 and ZSM-11 (U.S. Pat. No. 4,347,121) and ZSM-5 (U.S. Pat. No. 4,975,177).These various catalysts have different selectivities for different products. For example, while ZSM-5 is particularly effective for dewaxing lube oil raffinates, the cracking selectivity to gaseous products is high resulting in low lube yield. There is still a need for a dewaxing catalyst and process selective towards the production of lube oil base stocks, and particularly for premium, high purity and high VI lube oils with low pour points.

SUMMARY OF THE INVENTION

It has been found that ferrierite can be ion exchanged with trivalent rare earth metal using a hydrothermal ion exchange method and that a dewaxing catalyst comprising the rare earth exchanged ferrierite exhibits better overall selectivity for producing lube oil fractions having a low pour point and a high VI than the hydrogen form of either ferrierite or mordenite. Thus, the invention relates to a process for catalytically dewaxing a waxy hydrocarbonaceous material by reacting the material with hydrogen, in the presence of a catalyst comprising ferrierite in which at least a portion, preferably at least 10%, more preferably at least 15% and still more preferably at least 25% of its cation exchange capacity is occupied by one or more trivalent rare earth metal cations, under reaction conditions effective to reduce the pour point of the material. By rare earth metal is meant the lanthanide elements and includes La, Ce, Pr, Nd, Sm, Eu, Gd, Tb, Dy, Ho, Er, Tm, Yb, Lu, Y and mixtures thereof Hereinafter, in the context of the invention "RE-ferrierite" is meant to include either natural or synthetic ferrierite in which at least a portion, preferably at least 10%, more preferably at least 15% and still more preferably at least 25% of the cation exchange capacity is occupied by one or more of these trivalent lanthanide elements. When used for catalytic dewaxing, at least one catalytic metal component effective for catalytic dewaxing is added to the RE-ferrierite. Such metal components will typically include at least one Group VIII metal and preferably at least one Group VIII noble metal. Further, the RE-ferrierite may be composited with other known catalytic components which are described in detail below. A dewaxing catalyst comprising RE-ferrierite of the invention to which has been added a Group VIII noble metal has been found to be particularly effective for producing high yields of dewaxed lubricating oil fractions of reduced pour point from Fischer-Tropsch wax that has been hydroisomerized to produce a mixture of iso-paraffins and normal paraffins. Prior to being catalytically dewaxed, hydrocarbon feeds derived from petroleum, shale oil, tar sands, and the like will be hydrotreated to remove sulfur and nitrogen compounds, aromatics and other unsaturates.

DETAILED DESCRIPTION

As set forth above, a typical dewaxing catalyst of the invention will comprise RE-ferrierite and also at least one catalytic metal component. The dewaxing catalyst of the invention is a dual function catalyst having both a hydroisomerization and a dehydrogenation-/hydrogenation function, with the RE-ferrierite providing the hydroisomerization function and the catalytic metal component the dehydrogenation/hydrogenation function. In one embodiment the catalyst will also contain one or more refractory catalyst support materials, including one or more additional molecular sieve components. The refractory catalytic support material may include, for example, any oxide or mixture of oxides such as silica which is not catalytically acidic and acid oxides such as silica-alumina, other zeolites, silica-alumina-phosphates, titania, zirconia, vanadia and other Group IIIB, IV, V or VI oxides. The Groups referred to herein refer to Groups as found in the Sargent-Welch Periodic Table of the Elements copyrighted in 1968 by the Sargent-Welch Scientific Company. A catalytic metal component, such as one or more Group VIII metals and preferably at least one noble metal of Group VIII, may be deposited on, ion exchanged into or composited with the RE-ferrierite or it may be supported on one or more refractory catalyst support materials or additional molecular sieve components that have been or will be composited or mixed with the RE-ferrierite. Thus, the catalytic metal, and promoter metal if present, is composited or mixed with, impregnated into, occluded or otherwise added to one or more of the other catalyst components either before or after they are all mixed together and extruded or pilled. In one embodiment it has been found to be effective to ion-exchange the catalytic metal (e.g., preferably a noble metal as Pt or Pd and preferably Pt) into the ferrierite. One or more metal promoter components of Groups VIB and VIIB may be used with the one or more Group VIII metal catalytic components. Typical catalytic dewaxing conditions useful in the process of the invention are set forth in the Table below.

| Condition | Broad | Preferred |
| --- | --- | --- |
| Temperature, ° F. | 300–950 | 400–800 |
| Total pressure, psig | 250–3,000 | 500–1,500 |
| LHSV | 0.1–10 | 0.5–5 |
| Hydrogen treat rate, SCF/B | 500–15,000 | 1,000–3,000 |

An RE-ferrierite dewaxing catalyst of the invention may be used to dewax any waxy hydrocarbonaceous feed, including light and heavy petroleum oils, slack wax, Fischer-Tropsch wax and the like. Prior to being catalytically dewaxed, hydrocarbon feeds derived from petroleum, shale oil, tar sands, and the like will be hydrotreated to remove sulfur and nitrogen compounds, aromatics, and nonaromatic unsaturates. It is preferable to deoil such feeds prior to the hydrotreating to an oil content of from about 0–35 wt. % and preferably 5–25 wt. %. The hydrotreating step is accomplished by reacting the feed with hydrogen in the presence of any well known hydrotreating catalyst at hydrotreating conditions. Such catalysts typically comprise catalytic metal components of Co/Mo, Ni/Mo or Ni/Co/Mo on alumina and are well known to those skilled in the art. Typical conditions include a temperature in the range of from 540–750° F., a space velocity of 0.1 to 2.0 v/v/hr, a pressure of from 500–3,000 psig and hydrogen treat rates of from 500–5,000 SCF/B. Further, if desired the feed may also be hydroisomerized prior to catalytic dewaxing.

A dewaxing catalyst comprising the RE-ferrierite of the invention has been found to be particularly effective for producing dewaxed lubricating oil fractions of low pour point with high product yield from Fischer-Tropsch wax that has been hydroisomerized over a dual function catalyst to produce a heavy boiling feed comprising a mixture of iso-paraffins and normal paraffins. When produced via a slurry process from a catalyst which includes a cobalt catalytic component, this Fischer-Tropsch wax feed is very pure, typically having less than 1 wppm of either sulfur or nitrogen and comprising at least 95 wt. % paraffins and even ≧98–99 wt. % paraffins which may also contain very minor (e.g., less than 1 wt. %) amounts of olefins and oxygenates. A waxy feed of this general composition and purity will ordinarily not require treatment prior to hydroisomerization, because any unsaturates and oxygenates which may be present are in such small quantities that they will be consumed in the hydroisomerization without adversely effecting the hydroisomerization catalyst. However, there are other known Fischer-Tropsch hydrocarbon synthesis processes and catalysts which will not produce a waxy feed of this purity and which may, therefore, require hydrotreating prior to hydroisomerization. By Fischer-Tropsch wax is generally meant the product of a Fischer-Tropsch hydrocarbon synthesis process containing $C_{5+}$ preferably $C_{10+}$ and more preferably $C_{20+}$ paraffinic hydrocarbons. In a slurry process, the wax comprises the hydrocarbon liquid withdrawn from the slurry reactor. For example, the Table below shows the fractional make-up (±10 wt. % for each fraction) of hydrocarbons synthesized in a slurry HCS reactor using a catalyst comprising cobalt and rhenium on a titania support.

| Boiling Temperature Ranges, ° F. | Wt. % of Fraction |
|---|---|
| IBP–320 | 13 |
| 320–500 | 23 |
| 500–700 | 19 |
| 700–1050 | 34 |
| 1050+ | 11 |
| Total | 100 |

During hydroisomerization of the waxy, paraffinic feed in the process of the invention, some of the heavy feed (e.g., 650° F.+ to 750° F.+), depending on the desired cut point and whether or not dewaxed fuel fractions are also desired, is converted to lower boiling components, with any olefins and oxygenates present being hydrogenated. Fuel fractions are generally dewaxed to reduce their cloud (or haze) and freeze points. Hydroisomerization conditions can vary widely. Broad ranges of temperature and pressure are typically 300–900° F. (149–482° C.) and 0–2500 psig, with preferred ranges of 550–750° F. (288–400° C.) and 300–1200 psig, respectively. The range of hydrogen treat rates is typically 500–5000 SCF/B and 50–500 SCF/B, with preferred ranges of 2000–4000 SCF/B and 50–500 SCF/B, respectively. The hydroisomerization catalyst comprises one or more catalytic metal components supported on an acidic metal oxide support to give the catalyst both a hydrogenation/dehydrogenation function and an acid hydroisomerization function. Illustrative, but non-limiting examples of such catalysts, their preparation and use may be found, for example, in U.S. Pat. No. 5,378,348 and 5,660,714. The isomerate is fractionated to separate the lighter 650° F.– to 750° F.– isomerate (depending on the desired cut point) from the heavier lube oil fraction, with the lighter material used for fuel boiling in the naphtha and diesel fuel ranges, if desired. The lube oil fraction is then catalytically dewaxed by reacting with hydrogen using the catalyst and process of the invention to further reduce its pour point.

Ferrierite is classified primarily as a medium pore size material having pore windows of 5.4□×4.2□ (p. 106, Atlas of Zeolite Structure Types, $4^{th}$, Ed., Elsevier 1996). Natural and synthetic ferrierite comprise a zeolite type of ion exchangeable, crystalline aluminosilicate molecular sieve having both ten and eight ring pore windows, with a silicon to aluminum atomic ratio of about five in natural ferrierite (although this can vary) and a ratio of from about eight to greater than thirty (typically from ten to twenty) in synthetic ferrierite, as is known. The preparation and composition of synthetic ferrierite is well known and discussed, for example, in U.S. Pat. Nos. 4,251,499 and 4,335,019. Both natural and synthetic ferrierite are commercially available in which the cation exchange positions are typically occupied by alkali metal cations, such as $Na^+$, $K^+$ and mixtures thereof. The alkali form is readily converted to the hydrogen form or to a hydrogen precursor form, such as the ammonium ion form, for subsequent ion exchange with the desired metal(s), simply by contacting it with an aqueous solution containing ammonium ions which exchange with the alkali metal cations. Calcination of the ammonium form will produce the hydrogen ($H^+$) or acid form, which can also be produced directly by contacting the ferrierite with a suitable material such as hydrochloric acid. While ferrierite both with and without a catalytic metal component is known as a dewaxing catalyst, examples of dewaxing using rare earth ion exchanged ferrierite have not been disclosed. This is not surprising, since the conventional ion exchange technique is ineffective for this purpose. For example, U.S. Pat. Nos. 4,584,286 and 5,288,475 which relate to ZSM-35, both refer to U.S. Pat. Nos. 3,140,249; 3,140,251 and 3,140,253 for conventional ion exchange techniques. The '249, '251 and '253 patents disclose metal ion exchange, including rare earth metal ion exchange, using aqueous salt solutions of the metal or metal and ammonia at atmospheric pressure and a temperature ranging from room temperature to 180° F. However, it has been found that this technique is not effective for ion exchanging rare earth metals with ferrierite. Furthermore, although rare earth metal ion exchange is included among a long list of potential cations, the surprising selectivity towards lube oil fractions resulting from the use of the trivalent rare earth exchanged ferrierite is no where mentioned. For example, using this technique to try to ion exchange lanthanum with ammonium ferrierite from an aqueous solution of lanthanum chloride at 180° F. for 48 hours, followed by washing with water, resulted in a lanthanum content of only 0.31 wt. %. This means that at maximum only about 5% of the cation exchange capacity was met by trivalent lanthanum cations in cation exchange positions. While not wishing to be held to any particular theory, it is believed that if ion exchange occurred, it may have occurred only on the exterior surface of the ferrierite and not in the pores where it is needed to be catalytically effective. Therefore, the present invention is unexpected in view of the prior art. In the practice of the invention, the trivalent rare earth metal or metals are ion exchanged into the ferrierite using a hydrothermal technique in which a hydrogen ferrierite precursor or hydrogen (H+) ferrierite is contacted with an aqueous solution of the desired trivalent rare earth metal or metals, under hydrothermal conditions, which means at a temperature above the normal atmospheric pressure boiling point of the solution. The time and temperature sufficient to achieve the desired level of exchange is determined experimentally. For example, ammonium ferrierite was immersed in a solution of lanthanum chloride in sealed vessel at a temperature of 392° F. (200° C.) for 24 hours and yielded a lanthanum exchanged ferrierite containing 1.97 wt. % La. This means that about 28% of the cation exchange capacity available for cation exchange was occupied by lanthanum. The time and temperature sufficient to achieve the desired level of exchange is determined experimentally. After ion exchange, the ion exchanged ferrierite may then be washed, dried, calcined and the ion exchange, washing, drying and calcining steps repeated as many times as needed to achieve the desired ion exchange level. As a practical matter, typically a mixture of two or more rare earth metals-will be ion exchanged. Illustrative but non-limiting examples include commercially available mixtures of lanthanum, cerium, praseodymium and neodymium as the main rare earth metals in the mix. For catalytic use, the cerium content of the mix is typically depleted.

As mentioned above, the silica to alumina mole ratio or the silicon to aluminum mole ratio of ferrierite will vary. The cation exchange capacity of the ferrierite is determined by the aluminum or alumina content. Each mole of aluminum ions substituted in tetrahedral positions of the zeolite framework generates a mole of negative charge on the framework. This charge is balanced by exchangeable cations. Since rare earth metal (RE) cations are trivalent, each mole of RE ion incorporated via ion exchange replaces three moles of alkali metal, ammonium or hydrogen ions. Therefore, the degree or percent of RE exchange which is a measure of cation exchange positions occupied by the trivalent rare earth cations is more meaningful than the weight percent of rare earth metal incorporated into the ferrierite after ion exchange with solutions containing one or more rare earth metal cations. The rare earth metal (RE) content, the $SiO_2/Al_2O_3$ mole ratio and the degree of exchange are all related by the expression:

% RE exchange=[3×(moles RE)]/ [(moles Al)×100]

These values are determined by any suitable analytical technique (such as elemental analysis) which yields the amount of each element present in the dry RE-ferrierite resulting after exchange and washing with water, to remove all metal that has not been ion exchanged. By way of example, the table below gives examples of the content in wt. % of the rare earth metal La calculated on a dry basis with variation of the $SiO_2/Al_2O_3$ mole ratio in the ferrierite and the % La exchanged. This shows that at high $SiO_2/Al_2O_3$ mole ratios of the ferrierite, elemental analysis will show low wt. % La even at substantial degrees of La exchange.

| | | Wt. % La at % La Exchange Shown | | | |
|---|---|---|---|---|---|
| $SiO_2/Al_2O_3$ | Si/Al | 5 | 10 | 20 | 30 |
| 5 | 2.5 | 1.09 | 2.16 | 4.22 | 6.21 |
| 10 | 5 | 0.64 | 1.27 | 2.51 | 3.71 |
| 20 | 10 | 0.35 | 0.70 | 1.38 | 2.06 |
| 50 | 25 | 0.15 | 0.30 | 0.59 | 0.88 |
| 80 | 40 | 0.09 | 0.19 | 0.37 | 0.56 |
| 100 | 50 | 0.08 | 0.15 | 0.30 | 0.45 |

With specific regard to waxy feeds produced by a Fischer-Tropsch hydrocarbon synthesis HCS) process, liquid and gaseous hydrocarbon products are formed by contacting a synthesis gas (syngas) comprising a mixture of $H_2$ and CO with a Fischer-Tropsch type of HCS catalyst, in which the $H_2$ and CO react to form hydrocarbons under shifting or non-shifting conditions and preferably under non-shifting conditions in which little or no water gas shift reaction occurs, particularly when the catalytic metal comprises Co, Ru or mixture thereof. Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674. Fixed bed, fluid bed and slurry hydrocarbon HCS processes are well known and documented in the literature. In all of these processes the syngas is reacted in the presence of a suitable Fischer-Tropsch type of hydrocarbon synthesis catalyst, at reaction conditions effective to form hydrocarbons. Some of these hydrocarbons will be liquid, some solid (e.g., wax) and some gas at standard room temperature conditions of temperature and pressure of 25° C. and one atmosphere. Slurry HCS processes are often preferred because of their superior heat (and mass) transfer characteristics for the strongly exothermic synthesis reaction and because they are able to produce relatively high molecular weight, paraffinic hydrocarbons when using a cobalt catalyst. Due to sulfur and nitrogen compound removal from the syngas feed prior to the synthesis reaction, the purity of the hydrocarbons produced by the process employing sulfur and nitrogen sensitive catalysts is exceptionally high, typically requiring little or no hydrotreating prior to isomerization, catalytic dewaxing or other upgrading operations. In a slurry HCS process, which is a preferred process in the practice of the invention, a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. The stoichiometric mole ratio for a Fischer-Tropsch HCS reaction is 2.0, but in the practice of the present invention it may be increased to obtain the amount of hydrogen desired from the syngas for other than the HCS reaction. In a slurry HCS process the mole ratio of the $H_2$ to CO is typically about 2.1/1 Slurry HCS process conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins (and more preferably $C_{20+}$) in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. The hydrocarbons which are liquid at the reaction conditions removed from the reactor (using filtration means and, optionally a hot separator to recover $C_{10+}$ from the HCS gas) comprise mostly (e.g., >50 wt. % and typically 60 wt. % or more) hydrocarbons boiling over 650–700° F. and comprise at least about 95 wt. % paraffins with negligible (e.g., less than 1 wppm) amounts of either nitrogen or sulfur compounds.

The invention will be further understood with reference to the examples below.

EXAMPLES

Example 1

Ammonium ion exchange of alkali metal ferrierite was performed by suspending 100 g of Na-ferrierite having a silicon to aluminum ratio of 8.4 in 500 ml of a 5 wt. % aqueous $NH_4Cl$ solution. The mixture was stirred for several hours at 50° C., filtered, and washed with distilled and deionized water. The exchange was repeated twice and the resulting $NH_4$-ferrierite was dried at 70° C. in a vacuum oven. Lanthanum ion exchange with the $NH_4$-ferrierite was achieved by sealing 7 g of $NH_4$-ferrierite and 40 ml of a 0.2 M aqueous solution of $LaCl_3$ in a Teflon lined stainless steel vessel, followed by heating at 200° C. for 24 hours with occasional shaking. The vessel was quenched with cold water and opened immediately. The solid was filtered, washed with hot distilled and deionized water until chloride free according to an $AgNO_3$ test and then dried at 70° C. in a vacuum oven. Elemental analysis of the $NH_4$-ferrierite and the La-ferrierite gave Si/Al atomic ratios of 8.1 in both cases. The La-ferrierite contained 1.86 wt. % La, indicating 27% of the available cation exchange positions were occupied by the lanthanum. Refinement of X-ray powder diffraction data gave orthorhombic cell constants of 18.84, 14.10 and 7.43 □ for the $NH_4$-ferrierite and 18.94, 14.12 and 7.45 □ for the La-ferrierite. The BET surface area of the $NH_4$-ferrierite was 288 m²/g and that of the La-ferrierite was 320 m²/g.

Comparative Example A

A 0.4 g sample of the $NH_4$-ferrierite prepared in Example 1 was mixed with 2.4 g of a 5 wt. % aqueous solution of $LaCl_3$ in a capped vial and heated to 180° F. for 48 hours with occasional shaking. The resulting material was separated from the solution by filtration, washed with distilled and deionized water until chloride-free by an $AgNO_3$ test and then dried in a vacuum oven at 70° C. Elemental analysis revealed a lanthanum content of only 0.31%, indicating that only about 5% of the available cation exchange positions may have been occupied by lanthanum.

Example 2

Dewaxing catalysts were prepared by adding 0.5 wt. % platinum to both the $NH_4$-ferrierite and the La-ferrierite prepared in Example 1. The Pt was added by ion exchange with the remaining ammonium sites on the ferrierite using $Pt(NH_3)_4(OH)_2$. These platinum loaded materials were then calcined in air at 400° C., pilled, crushed and screened to 14/35 Tyler mesh size. Elemental analysis revealed Pt contents of 0.57 and 0.54 wt. %, respectively.

Comparative Example B

An additional catalyst for comparative purposes was prepared by impregnation and extrusion comprising 0.5 wt. % Pt supported on a mixture of 80 wt. % mordenite and 20 wt. % alumina which was calcined in air at 400° C.

Example 3

A hydrocarbon synthesis gas comprising a mixture of $H_2$ and CO having a mole ratio of between 2.11–2.16 was reacted in a slurry comprising bubbles of the synthesis gas and particles of a Fischer-Tropsch hydrocarbon synthesis catalyst comprising cobalt and rhenium supported on titania in a hydrocarbon slurry liquid containing the particulate catalyst and bubbles of the synthesis gas. The hydrocarbon slurry liquid comprised hydrocarbon products of the synthesis reaction which were liquid at the reaction conditions. The reaction conditions included a temperature of 425° F., a pressure of 290 psig and a gas feed linear velocity of from 12 to 18 cm/sec. The alpha of the synthesis step was 0.92. A 700° F.+ boiling fraction was separated from the hydrocarbon product by flash distillation.

Example 4

The synthesized, 700° F.+ boiling hydrocarbon fraction from Example 3 comprised at least about 98 wt. % paraffins. This material was hydroisomerized by reacting it with hydrogen in the presence of a dual function hydroisomerization catalyst consisting of cobalt and molybdenum impregnated on an amorphous silica-alumina support. The reaction and reaction conditions were adjusted to achieve 50 wt. % conversion of the 700° F.+ material to lower boiling material and included a temperature of 700° F., a space velocity of 0.45 v/v/hr, a pressure of 1000 psig and a hydrogen treat rate of 2500 SCF/B. The resulting isomerate was fractionated to recover the 700° F.+ boiling fraction which comprised a mixture of normal paraffins and isoparaffins and had a pour point of 2° C.

Example 5

The dewaxing activity and selectivity of the three different catalysts prepared in Example 2 and in Comparative Example B was evaluated by reacting separate portions of the 700° F.+ isomerate fraction of Example 4 with hydrogen in the presence of each catalyst using an upflow, ⅜ inch fixed bed reactor at reaction conditions of 750 psig, 2.0 w/h/w and a hydrogen treat rate of 2500 SCF/B. The reaction temperature varied and was adjusted to achieve comparable lube product pour point for each catalyst. The results of these evaluations in terms of products and properties are shown in the Table below.

|  | Pt/$NH_4$-ferrierite | Pt/La-ferrierite | Pt/H-mordenite-alumina |
| --- | --- | --- | --- |
| Reactor Temp., ° F. | 635 | 635 | 518 |
| Gas ($C_1$–$C_4$) | 2.8 | 1.9 | — |
| Naphtha ($C_5$-320° F.) | 3.4 | 1.7 | — |

-continued

|  | Pt/NH$_4$-ferrierite | Pt/La-ferrierite | Pt/H-mordenite-alumina |
|---|---|---|---|
| Diesel (320–700° F.) | 16.5 | 12.6 | — |
| Lubes (700° F.+) | 78.3 | 84.5 | 59.4 |
| Lubes Pour Point, ° C. | −32 | −31 | −30 |
| Lubes VI | 142 | 144 | 145 |

As these data show, the Pt/La-ferrierite catalyst was more selective towards producing the dewaxed 700° F.+ boiling lubes product than the Pt/NH$_4$-ferrierite, with less gas make and higher lube yield at equivalent pour point. The Pt-mordenite catalyst produced significantly less 700° F.+ material, with substantially more gas make than the Pt/La-ferrierite catalyst of the invention.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A hydrocarbon synthesis and upgrading process comprising:
   (i) contacting a synthesis gas comprising a mixture of H$_2$ and CO with a Fischer Tropsch hydrocarbon synthesis catalyst at reaction conditions effective for said H$_2$ and CO to react to form hydrocarbons, at least a portion of which are solid at standard room temperature conditions of temperature and pressure;
   (ii) hydroisomerizing at least a portion of said hydrocarbons, including at least a portion of said solid hydrocarbons, by reacting said hydrocarbons with hydrogen in the presence of a hydroisomerization catalyst at conditions effective to form a waxy hydroisomerate comprising a mixture of paraffins and isoparaffins, and
   (iii) reacting at least a portion of said hydroisomerate with hydrogen in the presence of a dewaxing catalyst comprising at least one catalytic metal component and ferrierite in which at least a portion of its cation exchange positions are occupied by one or more trivalent rare earth metal cations, at reaction conditions effective to dewax said hydroisomerate.

2. A process according to claim 1 in which either or both the pour point and cloud point of said hydroisomerate is reduced.

3. A process according to claim 2 wherein said hydrocarbons are hydrotreated prior to said hydroisomerization reaction.

4. A process according to claim 2 wherein said catalytic metal component comprises a Group VIII noble metal component.

5. A process according to claim 1 wherein at least 10% of the ferrierite cation exchange capacity is occupied by said one or more rare earth metal cations.

6. A process according to claim 4 wherein at least 10% of the ferrierite cation exchange capacity is occupied by said one or more rare earth metal cations.

7. A process according to claim 3 wherein said catalytic metal component comprises a Group VIII noble metal component.

8. A process according to claim 6 wherein at least 15% of said cation exchange capacity is occupied by said rare earth metal cations.

9. A process according to claim 20 wherein at least 25% of said cation exchange capacity is occupied by said rare earth metal cations.

10. A process according to claim 1 wherein said dewaxed hydroisomerate comprises a lube oil fraction.

11. A process according to claim 9 wherein said dewaxed hydroisomerate comprises a lube oil fraction.

* * * * *